(12) United States Patent
Yamaguchi

(10) Patent No.: US 9,967,436 B2
(45) Date of Patent: May 8, 2018

(54) IMAGE FORMATION SYSTEM THAT GENERATES TEST DATA OBTAINS SAVE LOCATION AND GENERATES PERFORMANCE CORRECTION

(71) Applicant: Konica Minolta, Inc., Tokyo (JP)

(72) Inventor: Hiroshi Yamaguchi, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days. days.

(21) Appl. No.: 15/296,946

(22) Filed: Oct. 18, 2016

(65) Prior Publication Data

US 2017/0111550 A1    Apr. 20, 2017

(30) Foreign Application Priority Data

Oct. 19, 2015 (JP) .................. 2015-205416

(51) Int. Cl.
*H04N 1/60* (2006.01)
*H04N 1/00* (2006.01)

(52) U.S. Cl.
CPC ....... *H04N 1/6055* (2013.01); *H04N 1/00018* (2013.01); *H04N 1/00023* (2013.01); *H04N 1/00034* (2013.01)

(58) Field of Classification Search
None
See application file for complete search history.

(56) References Cited

U.S. PATENT DOCUMENTS

| 5,760,913 A * | 6/1998 | Falk ..................... H04N 1/6033 358/504 |
| 6,048,117 A * | 4/2000 | Banton .............. H04N 1/00002 400/120.09 |
| 7,973,987 B2 * | 7/2011 | Dokuni ................ H04N 1/2032 358/408 |
| 8,223,399 B1 * | 7/2012 | Lee .......................... H04N 1/60 358/1.9 |

FOREIGN PATENT DOCUMENTS

JP    2002-163089 A    6/2002

* cited by examiner

*Primary Examiner* — Thomas D Lee
(74) *Attorney, Agent, or Firm* — Osha Liang LLP

(57) ABSTRACT

An image formation system includes an image formation apparatus that outputs a test chart; and external equipment that generates data for correction of performance of the image formation apparatus based on the test chart output by the image formation apparatus. The image formation apparatus also outputs save location information associated with the test chart. The external equipment transmits the data for performance correction to a location identified by the save location information. The save location information identifies at least a memory device of an apparatus other than the image formation apparatus as a save location to save the data for performance correction. The image formation apparatus corrects performance of the image formation apparatus using the data for performance correction that is obtained from the location identified by the save location information.

18 Claims, 6 Drawing Sheets

IMAGE FORMATION SYSTEM THAT GENERATES TEST DATA OBTAINS SAVE LOCATION AND GENERATES PERFORMANCE CORRECTION

This application is based on Japanese Patent Application No. 2015-205416 filed with the Japan Patent Office on Oct. 19, 2015, the entire content of which is hereby incorporated by reference.

BACKGROUND OF THE INVENTION

Field of the Invention

This disclosure relates to an image formation system, and particularly to an image formation system which generates correction data for an image formation apparatus, based on a test pattern which the image formation apparatus forms, and a method for controlling the system, an image formation apparatus configuring the system, and a program for controlling a computer of the image formation apparatus.

Description of the Related Art

Conventionally, an image formation system has been proposed which causes an image formation apparatus connected via a network to print a pattern for gray level correction (i.e., a test pattern), and performs gray level correction of the image formation apparatus based on the result of the printing.

For example, Japanese Laid-Open Patent Publication No. 2002-163089 discloses an image formation system. In the image formation system, a first image formation apparatus connected via a network causes a second image formation apparatus to output a test pattern and reads the output test pattern, and accordingly transmits data for gray level correction to the second image formation apparatus.

However, in the image formation system disclosed in Japanese Laid-Open Patent Publication No. 2002-163089, the data for gray level correction is only destined for an apparatus subject to gray level correction (i.e., the second image formation apparatus). When the data is transmitted to an apparatus subject to gray level correction that is in a state in which the apparatus cannot receive the data, retransmission of the data is required. A case in which the above apparatus is in a state in which when the data is transmitted the apparatus cannot register a gray level correction operation also entails retransmission of the data.

Accordingly there is a demand for an image formation system ensuring correction of performance of an image formation apparatus while avoiding impaired operating efficiency as much as possible.

SUMMARY OF THE INVENTION

According to an aspect of this disclosure, an image formation system includes an image formation apparatus that outputs a test chart; and external equipment that generates data for performance correction of the image formation apparatus based on the test chart output by the image formation apparatus. The image formation apparatus outputs save location information together with the test chart, the save location information identifying a save location for saving the data for performance correction. The external equipment transmits the data for performance correction to a location identified by the save location information. The save location information identifies at least an apparatus other than the image formation apparatus as the save location. The image formation apparatus receives the data for performance correction from the location identified by the save location information to correct performance of the image formation apparatus using the data for performance correction.

According to another aspect of this disclosure, a method for controlling an image formation system including an image formation apparatus and external equipment includes outputting, by the image formation apparatus, save location information together with a test chart, the save location information identifying a save location for saving data for performance correction; generating, by the external equipment, data for performance correction of the image formation apparatus based on the test chart; transmitting, by the external equipment, the data for performance correction to a location identified by the save location information; obtaining, by the image formation apparatus, the data for performance correction from the location identified by the save location information; and correcting, by the image formation apparatus, performance of the image formation apparatus using the data for performance correction.

According to still another aspect of this disclosure, an image formation apparatus includes an image formation unit that outputs, together with a test chart, save location information identifying a save location of data generated based on the test chart for performance correction; a processor that obtains the data for performance correction from a location identified by the save location information and corrects performance of the image formation unit using the data for performance correction.

According to still another aspect of this disclosure, a non-transitory computer readable storage medium storing a computer readable program for controlling a computer of an image formation apparatus including an image formation unit that output a test chart, causes the computer to output, together with the test chart, save location information identifying a save location of data generated based on the test chart for performance correction; obtain the data for performance correction from a location identified by the save location information; and correct performance of the image formation unit using the data for performance correction.

The foregoing and other objects, features, aspects and advantages of the present invention will become more apparent from the following detailed description of the present invention when taken in conjunction with the accompanying drawings.

DETAILED DESCRIPTION

Hereafter, reference will be made to the drawings to describe embodiments of the invention. In the following description, identical components are identically denoted. Their names and functions are also identical. Accordingly, they will not be described repeatedly.

[1. Summary of Image Formation System]

Figure 1:
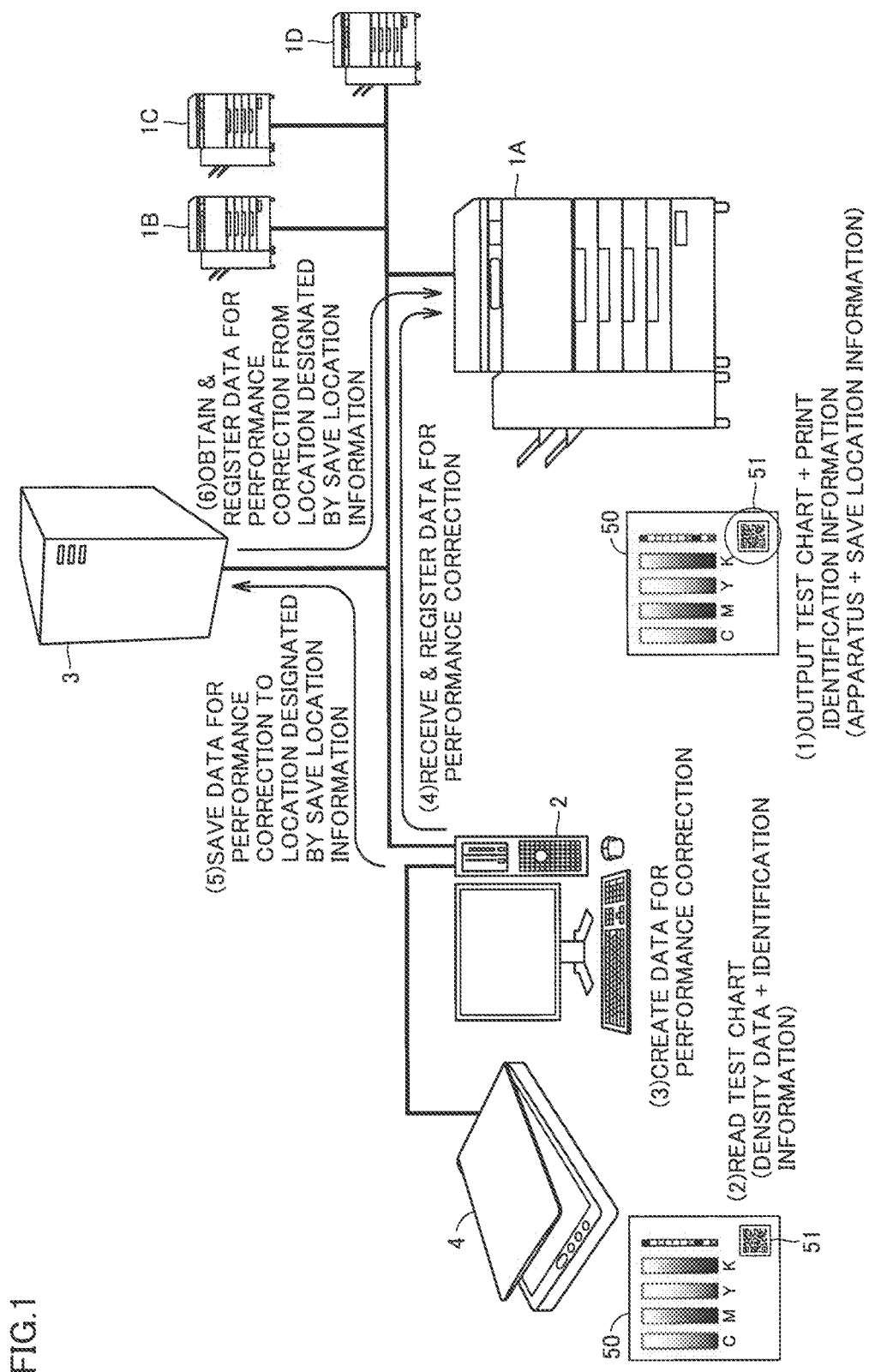
FIG. 1 schematically shows a configuration of an example of an image formation system in accordance with embodiments of the invention.

FIG. 1 schematically shows a configuration of an example of an image formation system in accordance with embodiments of the invention. As shown in FIG. 1, the image formation system includes four image formation apparatuses (image formation apparatuses 1A, 1B, 1C, and 1D). Four image formation apparatuses 1A, 1B, 1C, and 1D may collectively be referred to as an "image formation apparatus 1." The image formation system includes one or more image formation apparatuses. That is, the image formation system may include any number of image formation apparatuses other than four image formation apparatuses. Furthermore, the image formation system includes a terminal 2, a server 3, and a colorimeter 4.

In the image formation system, image formation apparatus 1 forms and outputs a test chart 50. Test chart 50 is a chart representing a predetermined pattern about each color of C (cyan), M (magenta), Y (yellow), and K (black). Test chart 50 is transported to colorimeter 4 manually or via a transporting device.

Colorimeter 4, for example, includes an image reader such as a scanner, and generates data such as density data etc. from test chart 50 and transmits the generated data to terminal 2.

Terminal 2 is implemented, for example, as a general-purpose personal computer (PC) in which a program for generating data for performance correction is installed on a non-transitory computer readable storage medium of the personal computer. When the data of test chart 50 is received from colorimeter 4, terminal 2 generates data for correction of performance of the image formation apparatus (i.e., colorimetric data) based on the received data. Terminal 2 is an example of external equipment which generates data based on the test chart for performance correction.

Test chart 50 in this disclosure includes identification information 51. Identification information 51 identifies a save location of the data generated based on test chart 50 for performance correction. That is, each image formation apparatus 1 stores information which identifies the save location (e.g., an apparatus and an address) of the data for correction of performance of image formation apparatus 1, and uses that information to output test chart 50 with identification information 51 added thereto.

In addition to the data based on the density data, colorimeter 4 generates data based on identification information 51 as the data of test chart 50.

Terminal 2 generates data for performance correction using the data based on the density data. Subsequently, terminal 2 transmits the data for performance correction to the save location identified by the data based on identification information 51 (or registers the data with the location). In the image formation system of FIG. 1, an example of the save location is a memory device in server 3.

The save location may identify image formation apparatus 1 which outputs test chart 50, and server 3. When terminal 2 requests registration of data for performance correction with image formation apparatus 1 (i.e., a first save location) and receives a response from image formation apparatus 1 indicating that it rejects the request, terminal 2 may transmit/register the data for performance correction to/with server 3 (i.e., a second save location).

After each image formation apparatus 1 outputs test chart 50, image formation apparatus 1 obtains the data for performance correction from the save location identified by identification information 51 that image formation apparatus 1 outputs to test chart 50. Image formation apparatus 1 corrects performance of image formation apparatus 1 using the data for performance correction. An example of performance to be corrected is gray level correction.

[2. Configuration of Image Formation System]

Figure 2:
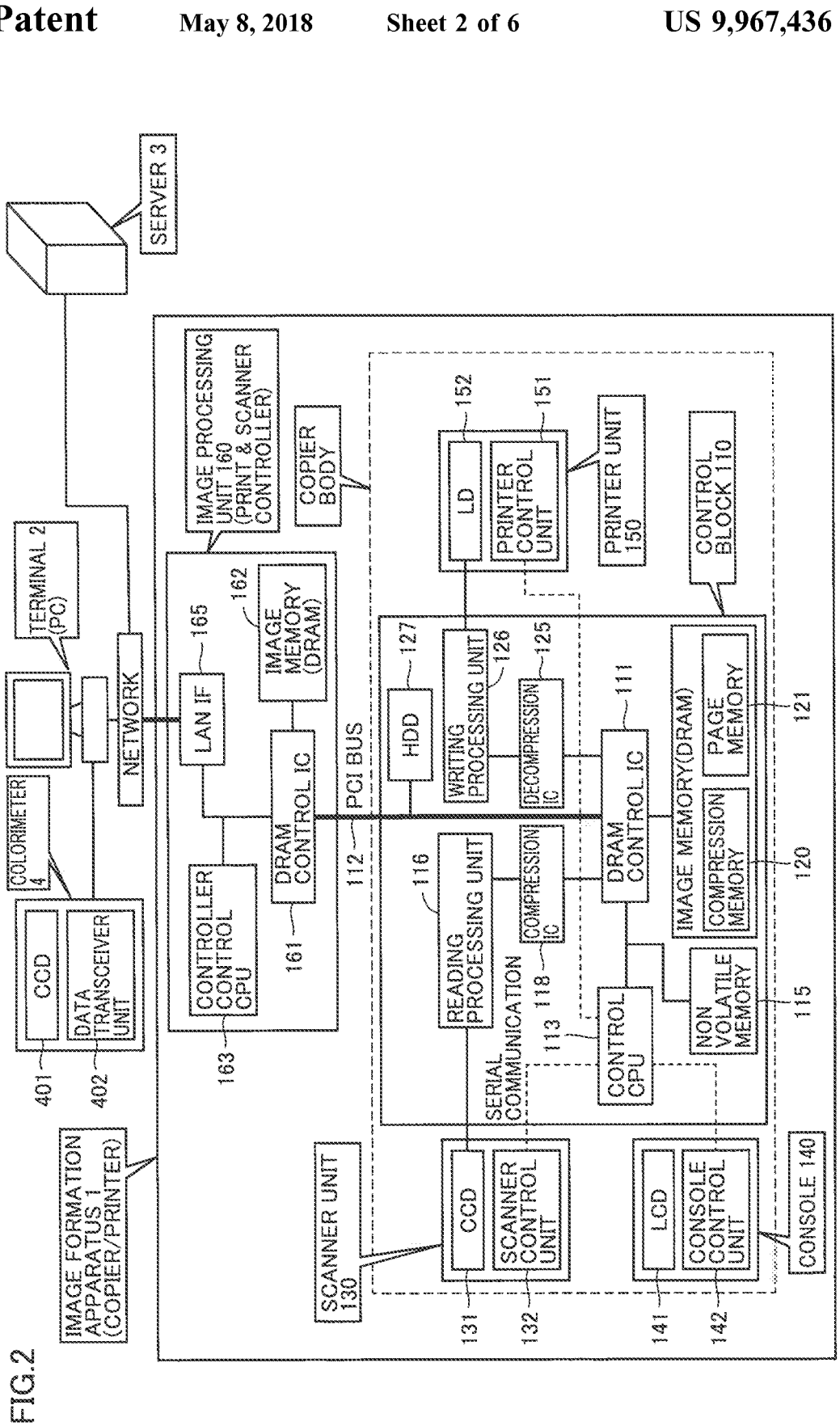
FIG. 2 is a general block diagram of the image formation system in accordance with embodiments of the invention.

FIG. 2 is a general block diagram of the image formation system in accordance with embodiments of the invention.

(1) Image Formation Apparatus 1

Initially, a configuration of image formation apparatus 1 will be described. In this disclosure, a digital multifunctional machine (a copier, printer and scanner) is shown as an example of image formation apparatus 1 in accordance with embodiments of the invention.

Image formation apparatus 1 includes a digital copier body and an image processing unit 160. The digital copier body has a control block 110, scanner unit 130, a console 140, and a printer unit 150. Image processing unit 160 is configured to process image data received from terminal 2 via a LAN (Local Area Network) and transfer via the LAN to terminal 2 image data obtained via scanner unit 130.

Control block 110 has a DRAM (Dynamic Random Access Memory) control IC (Integrated Circuit) 111 and a PCI (Peripheral Component Interconnect) bus 112. PCI bus 112 connects image processing unit 160 to DRAM control IC 111.

DRAM control IC 111 is connected to an image memory. The image memory is composed of a compression memory 120 and a page memory 121. Compression memory 120 is a memory for storing compressed image data. Page memory 121 is a memory for temporarily storing non-compressed image data to be printed before image formation. Image processing unit 160 obtains image data which is in turn transmitted to DRAM control IC 111 via PCI bus 112 as a printing operation is performed.

Control block 110 has a control CPU (Central Processing Unit) 113. Control CPU 113 is connected to DRAM control IC 111.

Furthermore, control CPU 113 is connected to a non-volatile memory 115 composed of a flash memory etc. A variety of setting information of image formation apparatus 1 is previously stored in non-volatile memory 115. The setting information is initial printing setting information, mechanical setting information such as a process control parameter etc., a user setting value, a state of operation, the number of targets to be sampled corresponding to a maximal control load degree in a mechanical configuration, a period, and/or a priority of a target to be sampled. In non-volatile memory 115 are stored a program for operating control CPU 113 in a manner indicated in this disclosure, and data utilized for execution of the program.

Control CPU 113 can read non-volatile data of non-volatile memory 115 and write data to non-volatile memory 115. Control CPU 113 can control performance of each unit of image formation apparatus 1 according to the above described mechanical setting information, printing setting information, etc. and correct the performance.

Compression memory 120 can store image data, and data of a job. Control CPU 113 controls image formation in image formation apparatus 1 based on the image data and the data of the job stored in compression memory 120. Thus, control CPU 113 can thus obtain a state of operation such as a mode of operation in image formation. A time measurement unit (not shown) is connected to control CPU 113. Thus, control CPU 113 can obtain time information. Control CPU 113 executes a program according to this disclosure. The program is stored in a ROM etc. (not shown). When image formation apparatus 1 is powered on, control CPU 113 reads the program and initiates image formation apparatus 1.

The program may be recorded in/on a non-transitory recording medium which is detachably attachable to image formation apparatus 1.

Scanner unit 130 includes a CCD (Charge Coupled Diode) 131 which performs optical reading, and a scanner control unit 132 which generally controls scanner unit 130. Scanner control unit 132 is connected to control CPU 113. Scanner control unit 132 controls operation of scanner unit 130 by communicating with control CPU 113 for example via serial communication. CCD 131 is connected to a reading processing unit 116 which processes image data read by CCD 131. Reading processing unit 116 is controllably connected to DRAM control IC 111.

Image formation apparatus 1 may have an automatic document feeder (ADF). The ADF transports a plurality of originals successively to allow scanner unit 130 to read the originals successively.

Console 140 receives operation from the user. Console 140 may be implemented in the form of a touch panel. In this case, console 140 also functions as a display device. Console 140 includes an LCD (Liquid Crystal Display) 141, and a console control unit 142 which generally controls the console. Console control unit 142 is connected to control CPU 113. Console control unit 142 and control CPU 113 communicate for example via serial communication.

Console 140 is controlled by control CPU 113. Console 140 receives via LCD 141 a variety of inputs of settings such as a mechanical setting input such as an output condition setting and a performance control condition in image formation apparatus 1 and an input of a setting for sheet information (size and sheet type) for each sheet feeding tray. Console 140 displays information such as warning via LCD 141.

DRAM control IC 111 is connected to a compression IC 118 which compresses image data, and a decompression IC 125 which decompresses compressed image data. Decompression IC 125 is connected to a writing processing unit 126. Writing processing unit 126 is connected to an image formation unit including an LD (laser diode) 152 of printer unit 150, etc., and processes write data used for operation of LD 152. While FIG. 2 shows only LD 152 as the image formation unit, the image formation unit may also include any known element that a typical image formation apparatus includes for image formation. Other than the image formation unit, printer unit 150 includes a sheet feeding tray 21 and a sheet transportation unit including a transporting path 22.

Printer unit 150 includes a printer control unit 151 which generally controls printer unit 150 (such as sheet feeding, image formation, sheet discharging, post-processing, etc.). Printer control unit 151 is connected to control CPU 113. Printer control unit 151 operates in response to a control command issued from control CPU 113 to control printer unit 150.

DRAM control IC 111 is connected to DRAM control IC 161 of image processing unit 160 via PCI bus 112. When image formation apparatus 1 is used as a network printer or a network scanner, image processing unit 160 receives image data etc. from a LAN-connected apparatus (e.g., terminal 2) by image formation apparatus 1 and transmits to a LAN-connected apparatus (e.g., terminal 2) image data obtained via scanner unit 130.

In image processing unit 160, an image memory 162 is connected DRAM control IC 161. Image memory 162 is composed of DRAM for example.

In image processing unit 160, DRAM control IC 161 is connected, by a common bus, to a controller control CPU 163 which generally controls image processing unit 160, and a LAN interface (IF) 165. LAN interface 165 is connected to a LAN.

PCI bus 112 is connected to a hard disk (HDD) 127. HDD 127 stores image data obtained via scanner unit 130, image data generated by terminal 2 etc. connected to image processing unit 160, or the like.

A basic operation of image formation apparatus 1 is as follows:

When image data of an original read by scanner unit 130 is generated, CCD 131 optically reads an image of the original. At the time, scanner control unit 132 which receives a command from control CPU 113 controls operation of CCD 131. The image data read by CCD 131 is processed by reading processing unit 116 and subsequently compressed by compression IC 118. The compressed image data is stored via DRAM control IC 111 to compression memory 120 or HDD 127. The image data stored in compression memory 120 or HDD 127 may be managed by control CPU 113 as a job. After the image data is temporarily stored in compression memory 120, the image data may be transmitted via DRAM control IC 111 to HDD 127.

Image formation apparatus 1 can obtain image data from an external apparatus such as terminal 2 via a LAN. When the image data is externally obtained, DRAM control IC 161 stores the image data to image memory 162 via LAN interface 165.

The data in image memory 162 is passed via DRAM control IC 161, PCI bus 112, and DRAM control IC 111 to page memory 121 and temporarily stored therein. The data stored in page memory 121 is successively transmitted via DRAM control IC 111 to compression IC 118. The data is compressed by compression IC 118 and subsequently stored via DRAM control IC 111 to compression memory 120 and/or HDD 127 and managed by control CPU 113. When the image data is stored to HDD 127, the image data temporarily stored in compression memory 120 is transmitted via DRAM control IC 111 to HDD 127.

When an image is output by image formation apparatus 1 (i.e., when image formation apparatus 1 is used as a copying machine or a printer), the image data stored in compression memory 120 is output via DRAM control IC 111 to decompression IC 125. Decompression IC 125 decompresses the image data and transmits it to writing processing unit 126. LD 152 writes the image data to a photoreceptor (not shown) of image formation apparatus 1.

When an image of the image data stored in HDD 127 is formed, the image data stored in HDD 127 is passed via DRAM control IC 111 to compression memory 120 and temporarily stored therein. The image data stored in compression memory 120 is transmitted via DRAM control IC 111 to decompression IC 125. Decompression IC 125 outputs the decompressed data to writing processing unit 126 similarly as described above.

In printer unit 150, for example, a printer, each component is controlled by printer control unit 151 receiving a command from control CPU 113. In the image formation unit of printer unit 150, a toner image written on the photoreceptor is transferred to an intermediate transfer belt and subsequently transferred to a sheet supplied via the sheet feeding tray and fused and thus fixed by a fuser and fixer. The sheet is transported from sheet feeding tray on a transporting path. The image formation unit causes the sheet to abut against a resist roller to modify skew. The image formation unit obtains a resultant measurement of the position of the sheet as measured by a sheet position measurement unit. If necessary, the image formation unit corrects offset by rolling the resist roller. Subsequently, the sheet is transported to the image formation unit and thereafter on the sheet an image is formed as described above.

When a predetermined condition is established control CPU 113 instructs printer control unit 151 to form an image of the test pattern. An example of the predetermined condition is that a predetermined prescribed period of time has elapsed in image formation apparatus 1 since it formed an image of the immediately previous test pattern. Another example is that an instruction to form an image of a test pattern is input to console 140. A still another example is that via a LAN an instruction to form an image of a test pattern is input to image formation apparatus 1.

(2) Server 3

Server 3 has a communication interface for communicating with image formation apparatus 1 and terminal 2 via a LAN or a similar network. Server 3 has a memory device such as a hard disk for storing a variety of information.

(3) Colorimeter 4

Colorimeter 4 has a CCD 401 reading an image for generating data of the image and a transceiver unit (a communication interface) 402 for transmitting and receiving data to and from terminal 2. In colorimeter 4, CCD 401 generates image data of test chart 50 output from image formation apparatus 1 and transmits it to transceiver unit 402. Transceiver unit 402 transmits the image data to terminal 2.

(4) Terminal 2

Terminal 2 is implemented as a general-purpose computer, for example, and includes a processor. Terminal 2 has a communication interface for communicating with image formation apparatus 1, server 3, and colorimeter 4 via a network such as a LAN.

When the processor receives image data from colorimeter 4, the processor processes the image data according to a program to generate data for performance correction. The processor obtains, from the image data, information which identifies a destination of the data for performance correction. Subsequently, the processor transmits the data for performance correction to the identified destination.

In the image formation system shown in FIG. 2, terminal 2 is connected to image formation apparatus 1 and server 3 for example on a network, and connected to colorimeter 4 directly.

[3. Flow of Process]

(1) Outputting a Test Chart

Figure 3:
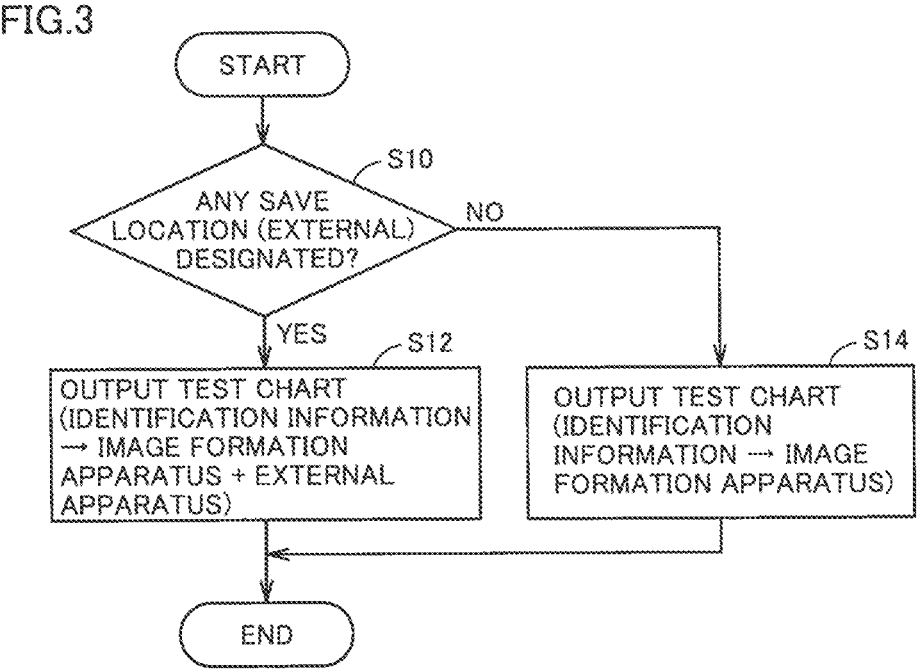
FIG. 3 is a flowchart of a process in which an image formation apparatus outputs a test chart in accordance with embodiments of the invention.

FIG. 3 is a flowchart of a process performed when image formation apparatus 1 outputs test chart 50 in accordance with embodiments of the invention. The process of FIG. 3 is started in response to the above described predetermined condition being established.

As shown in FIG. 3, in step S10, control CPU 113 determines whether there is any apparatus other than image formation apparatus 1 designated as a save location for data for performance correction. More specifically, control CPU 113 determines whether a save location is previously registered for example in image formation apparatus 1 at a memory device (e.g., non-volatile memory 115). When an instruction to generate test chart 50 is received, control CPU 113 may determine whether that instruction also designates a save location.

When control CPU 113 determines that an external apparatus is designated as a save location (YES in step S10), control CPU 113 proceeds to step S12. When control CPU 113 determines that no external apparatus is designated as a save location, control CPU 113 proceeds to step S14.

In step S12, control CPU 113 outputs test chart 50 such as shown in FIG. 1. Control CPU 113 forms in the test chart 50 as identification information 51 an image which represents a specific memory location in image formation apparatus 1 and the save location obtained in step S10. An example of the save location obtained in step S10 is an address in a memory device of server 3. An example of identification information 51 is a two-dimensional bar code.

The specific memory location in image formation apparatus 1 represents an address in non-volatile memory 115 for storing the data for performance correction for example. Control CPU 113 is configured to use the data for performance correction that is stored at the address to for example perform a correction operation such as gray level correction in a known manner.

In step S14, control CPU 113 outputs test chart 50 such as shown in FIG. 1. In test chart 50 output in step S14, identification information 51 is an image representing a specific memory location within image formation apparatus 1.

(2) Transmitting Data for Performance Correction

Figure 4:
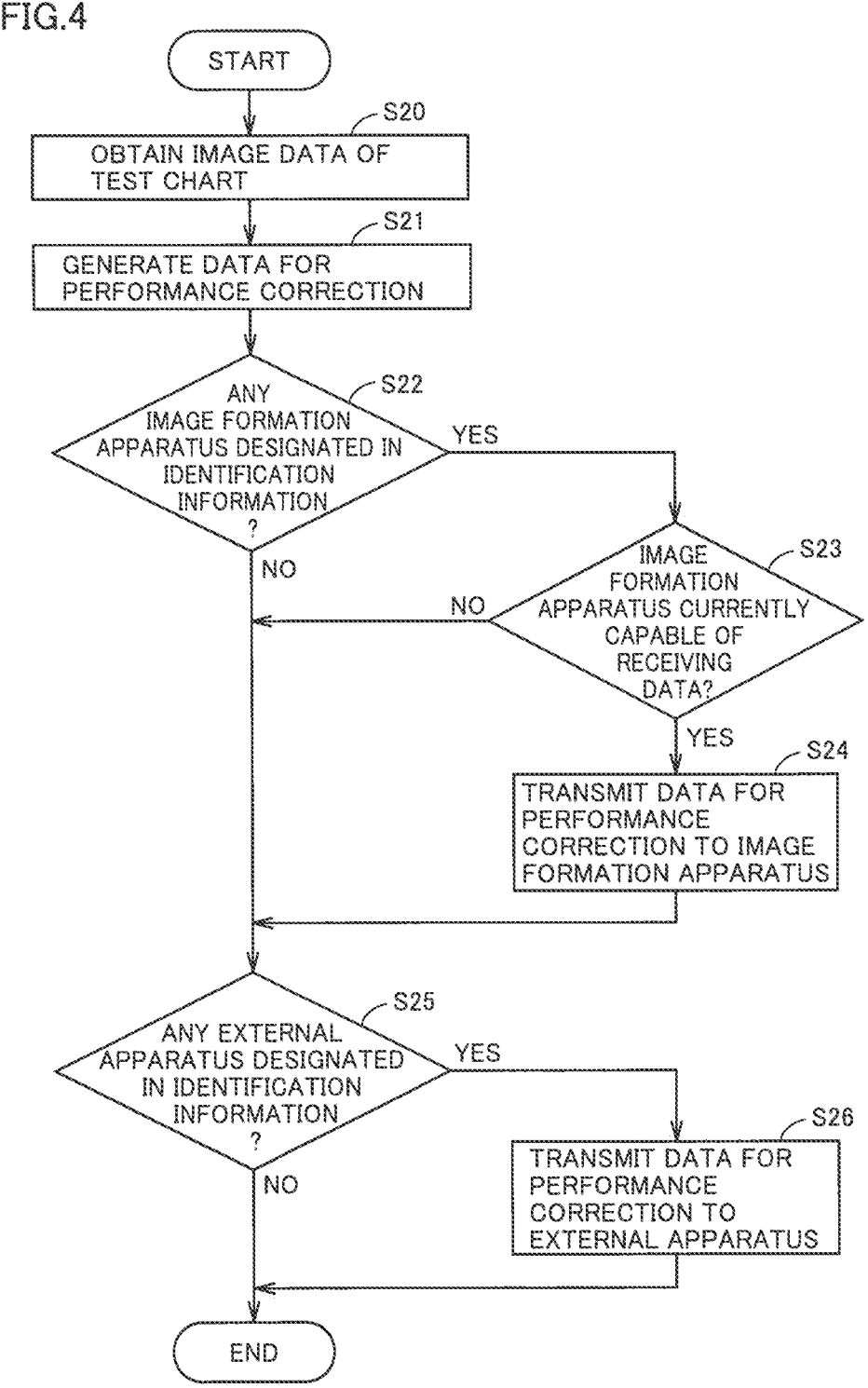
FIG. 4 is a flowchart of a process which a processor of a terminal performs to transmit data for performance correction in accordance with embodiments of the invention.

FIG. 4 is a flowchart of a process which a processor of terminal 2 performs to transmit data for performance correction in accordance with embodiments of the invention.

With reference to FIG. 4, in step S20, the processor obtains image data of test chart 50 from colorimeter 4. Subsequently, the control proceeds to step S21.

In step S21, the processor generates data for performance correction utilizing a portion of the image data obtained in step S20 that corresponds to density data. Subsequently, the control proceeds to step S22.

In step S22, the processor determines whether a portion of the image data obtained in step S20 that corresponds to identification information 51 includes information which designates a memory location of image formation apparatus 1. When the processor determines that information which designates a memory location of image formation apparatus 1 is included (YES in step S22), the control proceeds to Step S23. When the processor determines that information which designates a memory location of image formation apparatus 1 is not included (NO in step S22), the control proceeds to Step S25.

In step S23, the processor determines whether image formation apparatus 1 designated by the information which designates the memory location of image formation apparatus 1 is in a state in which it can receive data for performance correction. In the image formation system, image formation apparatus 1 may assume a state in which it cannot receive the data. An example of the state in which image formation apparatus 1 cannot receive the data is a state in which image formation apparatus 1 cannot externally communicate (e.g., LAN IF 165 is in a state in which it cannot communicate with another apparatus via a network).

When the processor determines that image formation apparatus 1 is in a state in which it can receive the data for performance correction (YES in step S23), the control proceeds to step S24. When the processor determines that image formation apparatus 1 is in a state in which it cannot receive the data (NO in step S23), the control proceeds to step S25.

In step S24, the processor transmits the data for performance correction to image formation apparatus 1. Subsequently, the control proceeds to step S25.

When image formation apparatus 1 receives the data for performance correction, control CPU 113 stores the data to non-volatile memory 115 at a specific address to thus register the data as data for performance correction. Once the data is registered in image formation apparatus 1 as data for performance correction, control CPU 113 uses that data to correct performance of the image formation unit.

In step S25, the processor determines whether a portion of the image data obtained in step S20 that corresponds to identification information 51 includes information which designates a memory location of an apparatus other than image formation apparatus 1. When the processor determines that that portion includes information which designates a memory location of an apparatus other than image formation apparatus 1 (YES in step S25), the control proceeds to Step S26. When the processor determines that that portion does not include information which designates a memory location of an apparatus other than image formation apparatus 1 (NO in step S25), the control ends the FIG. 4 control.

In step S26, the processor transmits the data for performance correction to the memory location of the apparatus other than image formation apparatus 1, as designated by the portion of the image data obtained in step S20 that corresponds to identification information 51. After that, the FIG. 4 control ends.

(3) Process When a State is Recovered in Image Formation Apparatus 1

Figure 5:
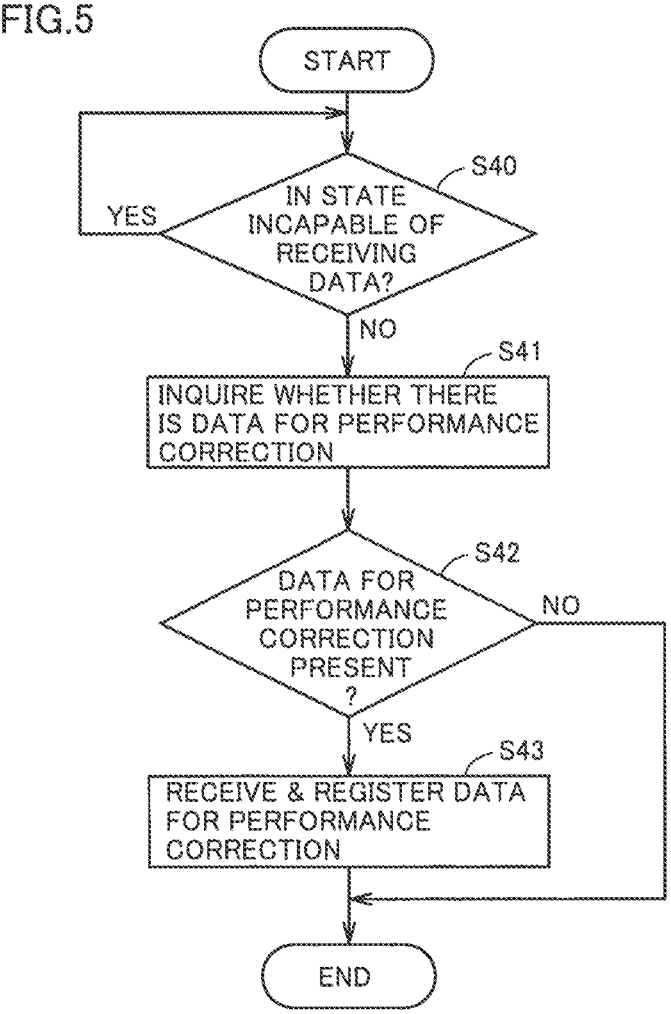
FIG. 5 is a flowchart of a process in which the image formation apparatus receives the data for performance correction from a save location identified by identification information of the test chart in accordance with embodiments of the invention.

FIG. 5 is a flowchart of a process in which image formation apparatus 1 receives the data for performance correction from a save location identified by identification information 51 of test chart 50 in accordance with embodiments of the invention.

As shown in FIG. 5, in step S40, control CPU 113 determines whether image formation apparatus 1 is in a state in which it cannot receive data for performance correction. An example of the state in which image formation apparatus 1 cannot receive the data is a state in which image formation apparatus 1 cannot externally communicate, as has been described above for step S23. When control CPU 113 determines that image formation apparatus 1 is in a state in which it cannot receive the data (YES in step S40), control CPU 113 repeats step S40 (for example whenever a predetermined period of time elapses). When control CPU 113 determines that image formation apparatus 1 is now in a state in which it can receive the data (NO in step S40), the control proceeds to step S41.

In step S41, control CPU 113 inquires of an external apparatus whether there is data for performance correction. In step S41, control CPU 113 makes the inquiry to an external apparatus obtained in step S10 (see FIG. 3). More specifically, in step S41, control CPU 113 inquires whether data for performance correction is stored in the save location obtained in step S10. The inquiry is made for example to server 3.

In the image formation system, test chart 50 may include an identification number of test chart 50. Terminal 2 may transmit data generated from test chart 50 for performance correction to the above save location together with the identification number of test chart 50. Control CPU 113 in step S41 may inquire whether data for performance correction which is stored in association with the identification number of test chart 50 that control CPU 113 generated, is stored. Subsequently, the control proceeds to step S42.

In step S42, control CPU 113 determines whether the inquiry made in step S41 is responded to by a reply indicating "the data for performance correction is stored." When control CPU 113 determines that the replay is "the data for performance correction is stored" (YES in step S42), the control proceeds to step S43. When control CPU 113 determines that the reply is other than that (NO in step S42), control CPU 113 ends the process of FIG. 5.

In step S43, control CPU 113 receives the data for performance correction, and, furthermore, stores the received data to non-volatile memory 115 at an address for correction processing. Thus, the data for performance correction is registered for that processing. Subsequently, the process of FIG. 5 ends.

(4) Registering Data Received from Terminal 2 for Performance Correction

Figure 6:
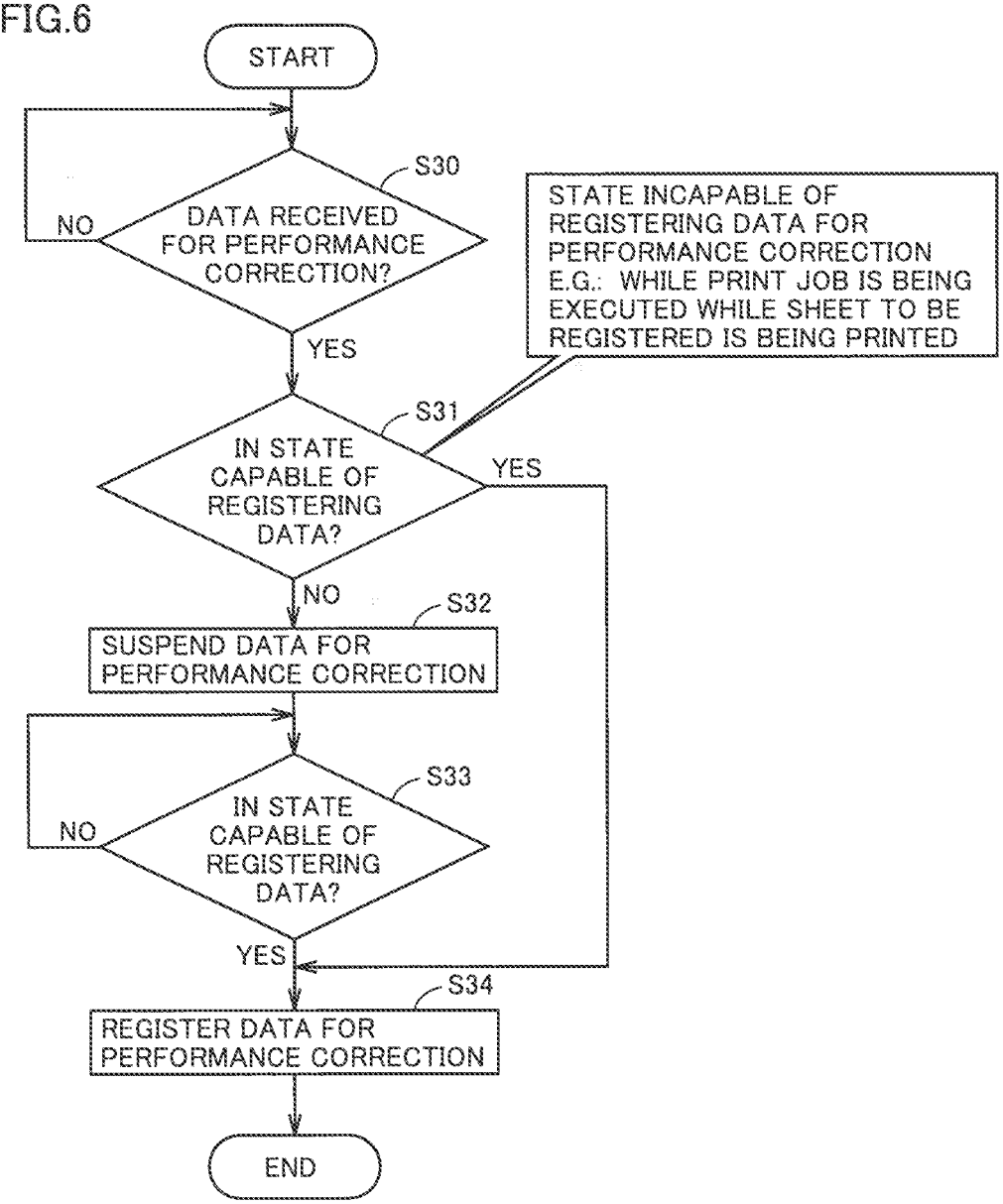
FIG. 6 is a flowchart of a process performed in the image formation apparatus when the data for performance correction is received from the terminal in accordance with embodiments of the invention.

FIG. 6 is a flowchart of a process in which when data for performance correction is received from terminal 2 control CPU 113 registers the data for correction processing in accordance with embodiments of the invention.

As shown in FIG. 6, in step S30, control CPU 113 determines whether data for performance correction is received from terminal 2. When control CPU 113 determines that the data is received (YES in step S30), control CPU 113 proceeds to step S31. In contrast, when control CPU 113 determines that the data is not received, control CPU 113 repeats step S30 (for example whenever a predetermined period of time elapses).

In step S31, control CPU 113 determines whether image formation apparatus 1 is in a state in which it can register the data for performance correction. An example of the state in which image formation apparatus 1 can register the data is a state in which image formation apparatus 1 stands by. An example of the state in which image formation apparatus 1 cannot register the data is a state in which image formation apparatus 1 cannot correct its performance. An example of the state in which image formation apparatus 1 cannot correct its performance is a state in which image formation apparatus 1 is executing a job. There is a case in which it is not preferable that a setting of an operation vary between a time when a job is started and that when the job ends. Accordingly, when a job is being executed, control CPU 113 determines that image formation apparatus 1 is in a state in which it cannot register data for performance correction.

When control CPU 113 determines that image formation apparatus 1 is in a state in which it can register the above data (YES in step S31), the control proceeds to step S34. When control CPU 113 determines that image formation apparatus 1 in a state in which it cannot register the above data (NO in step S31), the control proceeds to step S32.

In step S32, control CPU 113 suspends registering the received data for performance correction. An example of the suspension is temporary saving in non-volatile memory 115 at a location other than an address for registration. Another example of the suspension is saving in non-volatile memory 115 at an address for registration, and registration of suspension information. An example of registration of the suspension information is setting on a flag for the suspension. Subsequently, the control proceeds to step S33.

In step S33, control CPU 113 determines whether image formation apparatus 1 is in a state in which it can register the data for performance correction. When control CPU 113 determines that image formation apparatus 1 is in a state in which it cannot register the data (NO in step S33), control CPU 113 repeats step S33 for example whenever a predetermined period of time elapses. When control CPU 113 determines that image formation apparatus 1 is now in a state in which it can register the data (YES in step S33), the control proceeds to step S34.

In step S34, control CPU 113 registers the data for performance correction for processing for performance correction. An example of the registration is to change a location in which the data for performance correction is saved from a temporary saving location to a location for correction processing. Another example of the registration is to set off the suspension flag. Subsequently, control CPU 113 ends the FIG. 6 control.

In the present embodiment described above, test chart 50 includes identification information 51. Identification information 51 identifies an apparatus other than image formation apparatus 1 that outputs test chart 50 as a save location of data for performance correction. When terminal 2 transmits data for performance correction to image formation apparatus 1 and image formation apparatus 1 cannot receive the data (NO in the FIG. 4 step S23), terminal 2 transmits the data for performance correction to a save location identified by identification information 51 (e.g., a specific memory location in server 3). Subsequently, control CPU 113 of image formation apparatus 1 obtains the data for performance correction from that save location (the FIG. 5 step S41 to step S43).

Thus, according to the embodiment described above, data for correction of performance of an image formation apparatus is transmitted to a save location identified by information output by the image formation apparatus. Thus, if the state of the image formation apparatus when the data for performance correction is transmitted is a state in which the image formation apparatus cannot perform performance correction, it is not necessary to retransmit the data for performance correction.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

Further, although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image formation system, comprising:
   an image formation apparatus that:
      outputs a test chart and a save location information associated with the test chart, wherein the save location information identifies a save location for saving data for performance correction, and
      obtains data for performance correction of the image formation apparatus from the save location identified by the save location information;
   an external equipment that:
      generates the data for performance correction of the image formation apparatus based on the test chart, and
      transmits the data for performance correction to the save location,
   wherein the save location information identifies at least an apparatus other than the image formation apparatus as the save location.

2. The image formation system according to claim 1, wherein the save location information identifies:
   a memory device of the image formation apparatus, and
   the apparatus other than the image formation apparatus as the save location.

3. The image formation system according to claim 2, wherein when the external equipment transmits the data for performance correction to the memory device while the image formation apparatus cannot correct performance of the image formation apparatus, the external equipment transmits the data for performance correction to an apparatus different from the image formation apparatus.

4. The image formation system according to claim 3, wherein the image formation apparatus obtains the data for performance correction from the save location after the image formation apparatus outputs the test chart.

5. The image formation system according to claim 2, wherein the image formation apparatus obtains the data for performance correction from the save location after the image formation apparatus outputs the test chart.

6. The image formation system according to claim 1, wherein the image formation apparatus obtains the data for performance correction from the save location after the image formation apparatus outputs the test chart.

7. A method for controlling an image formation system comprising an image formation apparatus and external equipment, comprising:
   outputting, by the image formation apparatus, a test chart and a save location information associated with the test chart, wherein the save location information identifies a save location for saving data for performance correction;
   generating, by the external equipment, data for performance correction of the image formation apparatus based on the test chart;
   transmitting, by the external equipment, the data for performance correction to the save location identified by the save location information;
   obtaining, by the image formation apparatus, the data for performance correction from the save location; and
   correcting, by the image formation apparatus, performance of the image formation apparatus using the data for performance correction.

8. The method according to claim 7, wherein the save location information identifies:
   a memory device of the image formation apparatus, and
   an apparatus other than the image formation apparatus as the save location.

9. The method according to claim 7, wherein obtaining the data for performance correction is performed after the test chart is output.

10. The method according to claim 7, wherein the save location information identifies at least an apparatus other than the image formation apparatus as the save location.

11. An image formation apparatus, comprising:
   a printer that outputs:
      a test chart, and
      a save location information, associated with the test chart, that identifies a save location of data generated based on the test chart for performance correction; and
   a processor that:
      obtains the data for performance correction from the save location, and corrects performance of the printer using the data for performance correction.

12. The image formation apparatus according to claim 11, wherein the save location information identifies:
- a memory device of the image formation apparatus, and
- an apparatus other than the image formation apparatus as the save location.

13. The image formation apparatus according to claim 11, wherein the processor obtains the data for performance correction from the save location after the test chart is output.

14. The image formation apparatus according to claim 11, wherein the save location information identifies at least an apparatus other than the image formation apparatus as the save location.

15. A non-transitory recording medium storing a computer readable program for controlling a computer of an image formation apparatus, the image formation apparatus comprising a printer that outputs a test chart, wherein the program causes the computer to:

output save location information, associated with the test chart, that identifies a save location of data generated based on the test chart, wherein the data generated is for performance correction;
obtain the data for performance correction from the save location; and
correct performance of the printer using the data for performance correction.

16. The recording medium according to claim 15, wherein the save location information identifies:
- a memory device of the image formation apparatus, and
- an apparatus other than the image formation apparatus as the save location.

17. The recording medium according to claim 15, wherein the data for performance correction is obtained after the test chart is output.

18. The non-transitory recording medium storing a computer readable program for controlling a computer of an image formation apparatus according to claim 15, wherein the save location information identifies at least an apparatus other than the image formation apparatus as the save location.

* * * * *